United States Patent
Cameron

(10) Patent No.: US 7,664,776 B1
(45) Date of Patent: Feb. 16, 2010

(54) METHODS AND APPARATUS FOR DYNAMIC FORM DEFINITION

(75) Inventor: Stefan Cameron, Orleans (CA)

(73) Assignee: Adobe Systems Inc., San Jose, CA (US)

(*) Notice: Subject to any disclaimer, the term of this patent is extended or adjusted under 35 U.S.C. 154(b) by 281 days.

(21) Appl. No.: 11/641,150

(22) Filed: Dec. 19, 2006

(51) Int. Cl.
*G06F 17/00* (2006.01)

(52) U.S. Cl. .................. 707/102; 715/204; 715/224; 715/225; 715/231; 715/235; 715/237

(58) Field of Classification Search ............... 707/102, 707/1, 2, 3, 4; 715/204, 224, 225, 231, 235, 715/237
See application file for complete search history.

(56) References Cited

U.S. PATENT DOCUMENTS

| 2004/0189716 A1* | 9/2004 | Paoli et al. ................. 345/853 |
| 2004/0267813 A1* | 12/2004 | Rivers-Moore et al. .. 707/104.1 |
| 2005/0060645 A1* | 3/2005 | Raghavachari et al. ...... 715/513 |
| 2005/0108625 A1* | 5/2005 | Bhogal et al. ............... 715/505 |
| 2005/0183006 A1* | 8/2005 | Rivers-Moore et al. ..... 715/513 |
| 2006/0010054 A1* | 1/2006 | Gee ........................... 705/35 |
| 2009/0044103 A1* | 2/2009 | Chalecki et al. ............. 715/234 |

\* cited by examiner

*Primary Examiner*—James Trujillo
*Assistant Examiner*—Fatima P Mina
(74) *Attorney, Agent, or Firm*—Chapin IP Law, LLC

(57) ABSTRACT

A system provides a form manager that defines an electronic form comprising a field to populate with a data object. The form manager further defines a schema associated to the form. The schema describes the data object. The form manager further defines a variation rule for the electronic form. The variation rule describes a variation that may occur in the data object. The variation rule represents variation processing to be dynamically applied to the electronic form in response to detecting the variation.

25 Claims, 15 Drawing Sheets

```
300 <addressBlock>
    310 <address/>
    320 <city/>
    330 <state/>
    340 <zip/>
    350 <cellPhone/>
    360 <businessPhone/>
</addressBlock>
```

FIG. 14A

```
300 <addressBlock>
    310 <address/>
    315 <address2/>
    320 <city/>
    330 <state/>
    340 <zip/>
    350 <cellPhone/>
    360 <businessPhone/>
    370 <homePhone/>
</addressBlock>
```

FIG. 14B

```
400 <addressBlock>
    410 <address/>
    420 <address2/>
    430 <city/>
    440 <province/>
    450 <postalCode>
    460 <homePhone/>
    470 <cellPhone/>
    480 <businessPhone/>
</addressBlock>
```

FIG. 15

METHODS AND APPARATUS FOR DYNAMIC FORM DEFINITION

BACKGROUND

Computer systems allow for the exchange of information in a variety of ways. Conventional software applications operate on computer systems to allow people, commonly referred to as forms developers, to design and create electronic forms. An electronic form is a digital document that can be defined with form fields that can be electronically populated with data. Other computer users, often referred to as end users, can provide the data to the form fields to create a completed or populated form using a form completion application. An example of an electronic form is a Portable Document Format (PDF) form that a forms developer can create, and that an end user can populate, each using a software application such as Adobe Acrobat manufactured by Adobe Systems Incorporated of San Jose, Calif., U.S.A. Adobe and Acrobat are Trademarks of Adobe Systems Incorporated. In one configuration, such conventional forms development and forms population software applications or systems allow an end-user to specify a data object to be provided for an electronic form. Such a data object can be a data source that defines many data structures, data records, text or numeric data or other types of records having a common data organization— known as a schema. By providing the data object to the electronic form, the conventional software application that manages electronic forms can populate multiple versions of the form with each record of data from the data object as defined by the schema. In this manner, the end-users can populate many versions of the form with the data from the data object for any intended purpose. This population of forms with data sources defined by a schema can be automated to populate many forms at one time with little end user intervention.

SUMMARY

Conventional techniques for defining and populating electronic forms suffer from a variety of deficiencies. In particular, conventional techniques that allow users to define electronic forms do not allow for variations in schema formats for a particular data object. As an example, if a forms developer developed a form with form fields that can receive data according to a particular schema, the data object used to populate fields of the form must also conform to the schema. If a data object provided to populate the form does not exactly conform to the schema associated with that form, then the data object will not properly populate the form fields of the form. In such cases, the forms developer would need to revise the form to accommodate the data object that does not conform to the original schema. This process of revising the form is cumbersome and labor-intensive. Alternatively, the end user could modify the data object to conform to the schema associated to a form, but this is also cumbersome.

Embodiments disclosed herein significantly overcome such deficiencies and provide mechanisms and techniques that allow for the ability to create an electronic form that can dynamically accommodate variations in a data object and/or a schema that describes the data object used to populate the form. As an example, a simple electronic form can be associated with an address schema and can be defined as having form fields such as: Street, City, State and Zip Code. In accordance with configurations described herein, the form can also include a variation rule, created by the forms developer within the form using an electronic forms development application, that allows the forms developer to accommodate variations that can occur in an address data object used to populate the form. As also explained herein, the form can also be configured with a default rule to accommodate a data object that is based on a variation in the address schema itself—that is, a new or different schema than the schema originally associated to the form. Continuing with the example, the forms developer might define the variation rule to handle foreign address data existing within the data object used to populate the form. In this manner, if the data object included address data based on a variation of fields as defined in the original schema, the variation rule can indicate how that foreign address data is to be utilized within the presentation of the electronic form to an end-user. Additionally, if the form encountered a data object with address data that was based on an entirely new schema, the default rule and associated processing provided by the system disclosed herein can indicate how that unrecognized address data is to be utilized as well. Accordingly, rules for electronic forms can be defined to accommodate variations in data objects presented to populate the electronic forms and variations in the schema that describes the data objects. Therefore, the need to constantly revise forms to accommodate slight changes in a data object or a schema is significantly reduced.

More specifically, embodiments disclosed herein provide for dynamic form definition via a form manager that can be controlled by a user (e.g. forms developer) and configured to define an electronic form comprising a field (one or more fields) to populate with a data object. The form manager defines a schema that describes the data object, and the form manager associates the schema to the form. The form manager further allows the forms developer to define a variation rule for the electronic form. The variation rule describes a variation that may occur in the data object and represents variation processing to be dynamically applied to the electronic form in response to detecting the variation. By providing a variation rule and associated variation processing that can be embedded within the form, when the end user provides data objects that do not strictly conform to data formats of data objects as defined in the original schema associated to the form, the variation processing can define what is to be done in such circumstances. Examples of variation processing are to ignore the variations in the data object, or to create new fields that can accommodate rendering of the data differences (differences between schema definition and actual data object received) and so forth. Further details will be explained more fully in the detailed description section below.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein. Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif., U.S.A.

BRIEF DESCRIPTION OF THE DRAWINGS

The foregoing and other objects, features and advantages of the invention will be apparent from the following more particular description of embodiments of the methods and apparatus for dynamic form generation, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus for dynamic form generation.

FIG. 14A is an address schema that describes a data object with attributes for storing address data.

FIG. 14B is an address schema that describes a data object with a variation represented as extension attributes for storing address data.

FIG. 15 is a new schema describing a data object with attributes for storing address data.

DETAILED DESCRIPTION

Embodiments disclosed herein include methods, software and a computer system that perform a dynamic form definition process via a form manager. The form manager allows for the ability to define an electronic form that can dynamically accommodate variations in a data object used to populate the form and/or variations in a schema that describes the data object. As an example, an electronic form can be associated with an address schema and can be defined as having form fields such as: Street, City, State and Zip Code. In accordance with configurations described herein, the form can also include a variation rule that allows the forms developer to accommodate variations that can occur in an address data object used to populate the form. The form can also have a default rule to accommodate a data object that is based on a variation in the address schema itself—that is, a new schema. Continuing with the example, the forms developer might define the variation rule to handle foreign address data (e.g. non-United States address formats as used in other countries) existing within the data object used to populate the form. In this manner, if the data object included address data that contained a variation of fields as defined in the original schema, the variation rule can indicate how that address data is to be utilized within the presentation of the electronic form to an end-user. Additionally, if the form encountered a data object with address data that was based on an entirely new schema, the default rule can indicate how that address data is to be utilized as well. Accordingly, variation and default rules for electronic forms can be defined to accommodate variations in data objects presented to populate the electronic forms and variations in the schema that describes the data objects. Therefore, the need to constantly revise forms to accommodate slight changes in a data object or a schema is eliminated.

More specifically, embodiments disclosed herein provide for dynamic form definition via a form manager that can be controlled by a user and configured to define an electronic form comprising a field to populate with a data object. The form manager defines a schema that describes the data object, and the form manager associates the schema to the form. The form manager further allows the forms developer to define a variation rule for the electronic form. The variation rule describes a variation that may occur in the data object and represents variation processing to be dynamically applied to the electronic form in response to detecting the variation. Further, it is also understood that embodiments disclosed herein can be employed via a data structure for defining an electronic form where the data structure itself can include the form, the data object, the variation rule, the default rule, and one or more schemas.

Figure 1:
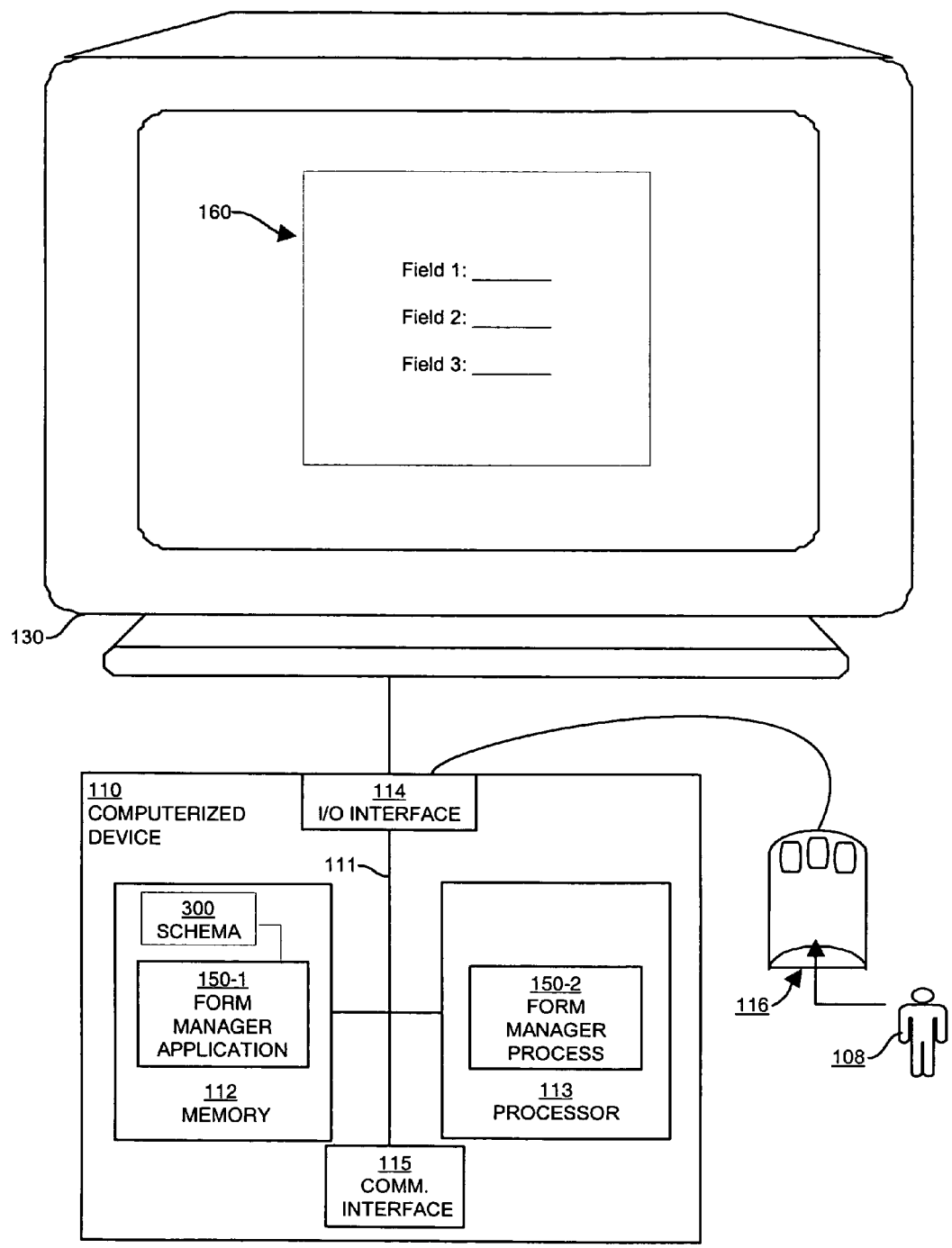
FIG. 1 is a block diagram of a computerized system configured with an application including a form manager in accordance with one embodiment of the invention.

FIG. 1 is a block diagram illustrating example architecture of a computer system 110 that executes, runs, interprets, operates or otherwise performs a form manager application 150-1 and form manager process 150-2 configured in accordance with embodiments of the invention. The computer system 110 may be any type of computerized device such as a personal computer, workstation, portable computing device, console, laptop, network terminal or the like. As shown in this example, the computer system 110 includes an interconnection mechanism 111 such as a data bus, motherboard or other circuitry that couples a memory system 112, a processor 113, an input/output interface 114, and a communications interface 115. An input device 116 (e.g., one or more user/developer controlled devices such as a keyboard, mouse, touch pad, etc.) couples to the computer system 110 and processor 113 through an input/output (I/O) interface 114 and enables a user 108 to provide input signals in order to define and generate a graphical representation of an electronic form 160 that the form manager application 150-1 and process 150-2 provides on the computer display 130.

The memory system 112 is any type of computer readable medium and in this example is encoded with a form manager application 150-1 that supports generation, display, and implementation of functional operations as explained herein. The form manager application 150-1 is associated with a schema 300 that describes one or more data objects, and the form manager application 150-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the form manager application 150-1. Execution of the form manager application 150-1 in this manner produces processing functionality in a form manager process 150-2. In other words, the process 150-2 represents one or more portions or runtime instances of the application 150-1 (or the entire application 150-1) performing or executing within or upon the processor 113 in the computerized device 110 at runtime.

Further details of configurations explained herein will now be provided with respect to flow charts of processing steps that show the high level operations disclosed herein to perform the form manager process 150-2, as well as graphical representations that illustrate implementations of the various configurations of the form manager process 150-2. Finally, for purposes, of this document, a person skilled in the art would recognize that the term data object can mean data, a data structure, a data value, a data type, and a data memory address or a combination of the preceding terms.

Figure 2:
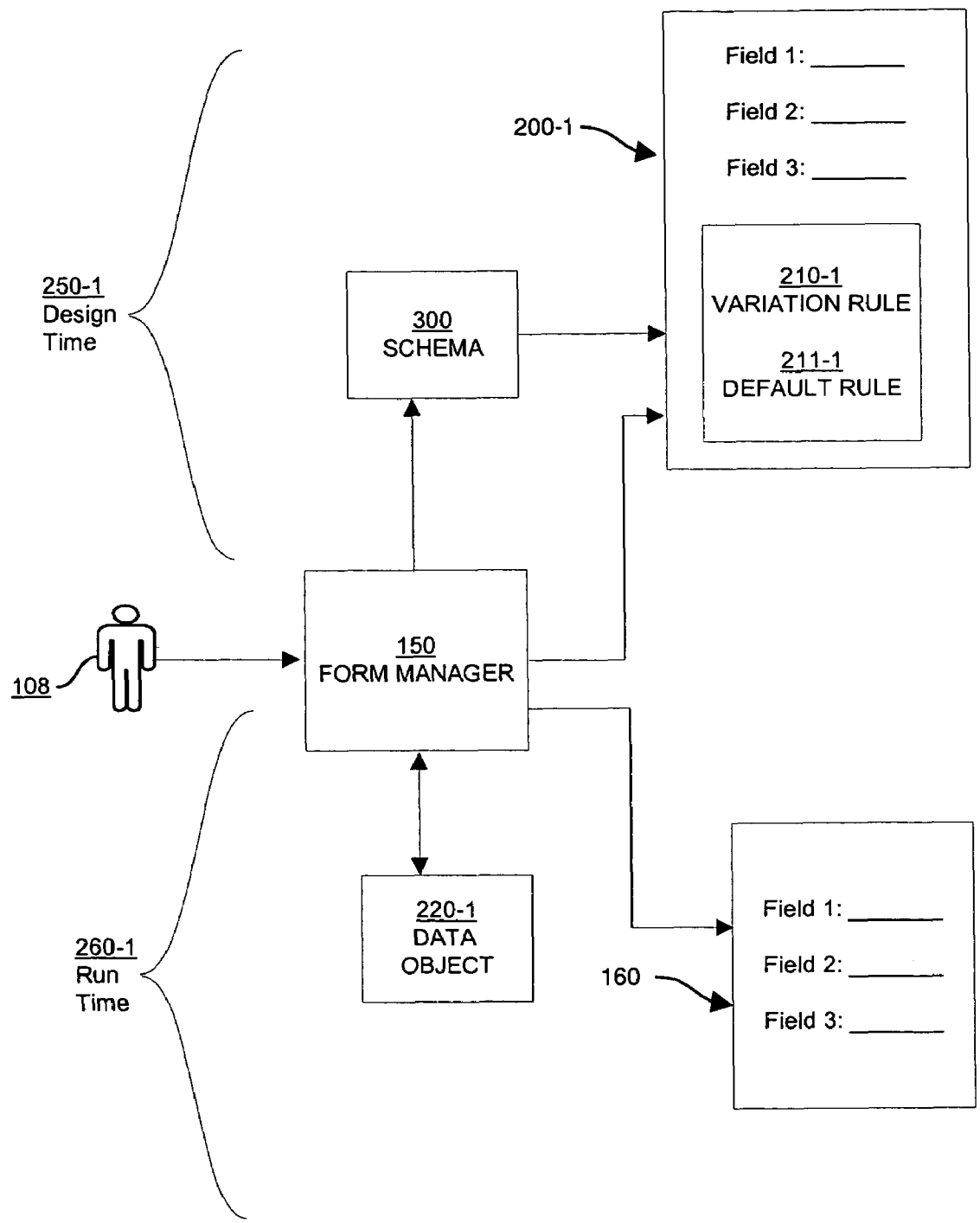
FIG. 2 is another block diagram of a computerized system configured with a form manager in accordance with one embodiment of the invention.

Processing details of the steps of FIGS. 3 to 13 will now be described in conjunction with an example operation of the form manager 150 as illustrated in FIG. 2. Regarding FIG. 2, a block diagram of a computerized system is shown configured with a form manager 150 in accordance with one embodiment of the invention. The computerized system of FIG. 2 includes a user 108, such as a forms developer, to employ the form manager 150 during two distinct phases: design time 250-1 and run time 260-1. In the example to be explained, the data object 220-1 may differ slightly from a data format defined or specified by the schema 300, yet the data object 220-1 may still be able to populate form fields (e.g. Fields 1, 2 and 3 as defined in the electronic form 200-1) as rendered in the complete form 160.

FIGS. 3 to 13 are a flow chart of processing steps performed by configurations disclosed herein to define an electronic form 200-1 via the form manager 150. Further, FIG. 14A is an example of an address schema 300 that is associated with electronic form 200-1, which describes a data object that stores address data. FIG. 14B is an extension of the address schema 300 of FIG. 14A, thereby showing a variation in the data object that stores address data. FIG. 15 is an example of a new schema 400 resulting from a variation of the FIG. 14A schema 300 itself. Finally, a person having ordinary skill in the art would understand that a schema that describes a data object can have a simple or complex definition. As an example, a schema can be defined as a plurality of unique sub-schemas while further describing the logical relationships between the sub-schemas.

I. Employing Form Manager 150 During Design Time 250-1

Figure 3:
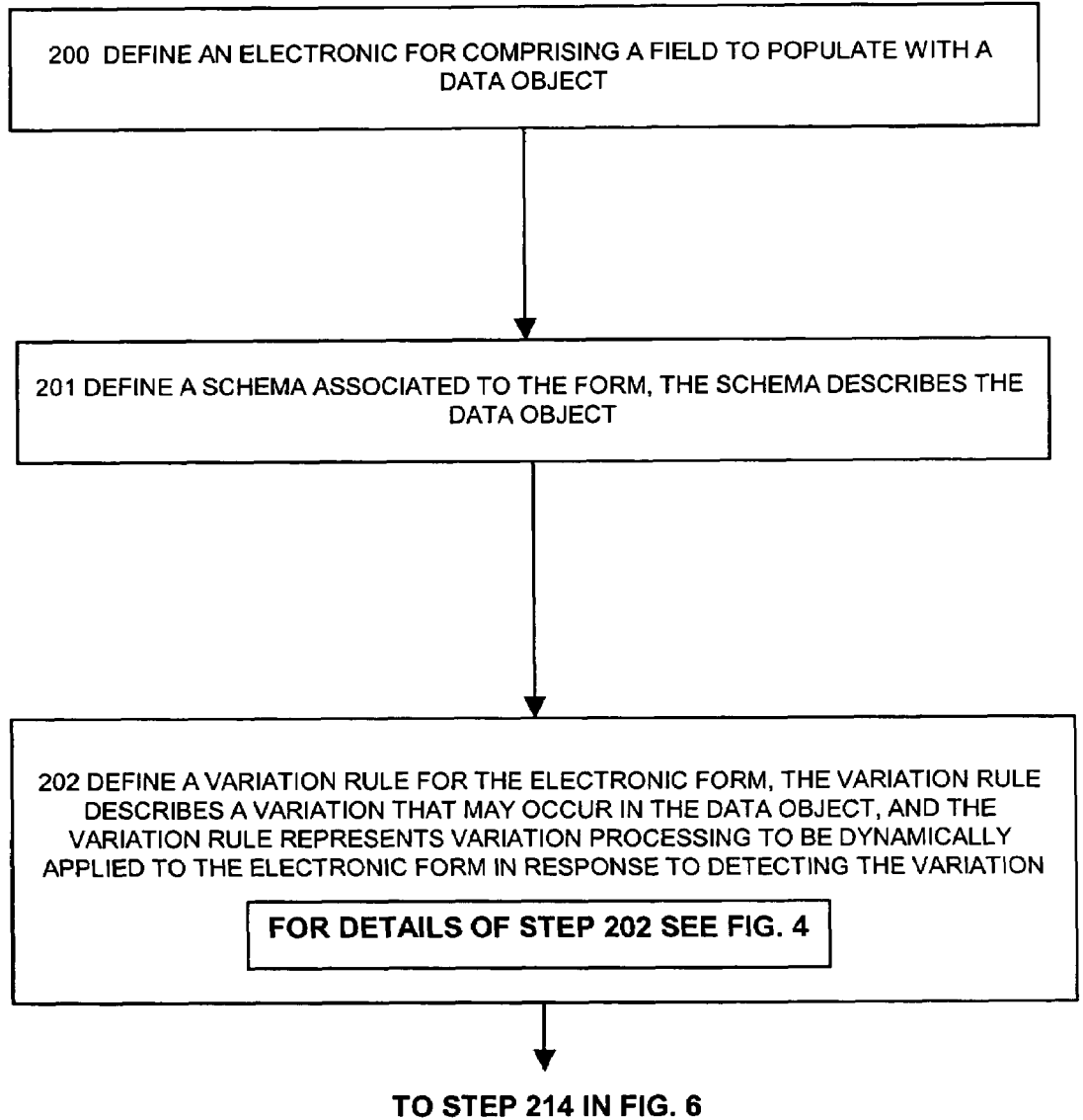
FIG. 3 is a flow chart of processing steps that show high-level processing operations performed by a form manager to define an electronic form, a schema and a variation rule.

Beginning in FIG. 3, at step 200, the form manager 150 defines an electronic form 200-1 comprising a field 205-1 to populate with a data object 220-1. As illustrated in FIG. 2, a user 108, such as a forms developer, operates the form manager 150 to define electronic form 200-1 as having field 205-1. It is understood that electronic form 200-1 can have a plurality of fields 205-1 that can be populated by data object 220-1.

In step 201, the form manager 150 defines a schema 300 that is associated to the form 200-1. The schema 300 describes the data object 220-1. The schema 300 can describe the data type, data size, data value, data memory location of data object 220-1 and the structure of data object 220-1. Referring to FIG. 14A, an example address schema 300 is shown that describes a data object that stores address data. Address schema 300 can describe a data object as having a data value for one or more attributes such as <address> 310, <city> 320, <state> 330, <zip> 340, <cellphone> 350 and <businessPhone> 360. Address schema 300 can be associated to form 200-1 such that one or more fields 205-1 can be populated by data object 220-1 if it has data values that correspond with the attributes 310, 320, 330, 340, 350, 360 as defined by address schema 300.

In step 202, the form manager 150 defines a variation rule 210-1 for the electronic form 200-1, the variation rule 210-1 describing at least one variation that may occur in the data object 220-1. For example, the variation rule 210-1 can be defined to detect if data object 220-1 has one or more attributes that are extensions of attributes already defined by address schema 300. Such extension attributes can be, for example, an additional <address> 310 attribute and an additional attribute based on the <businessPhone> 360 attribute.

Figure 4:
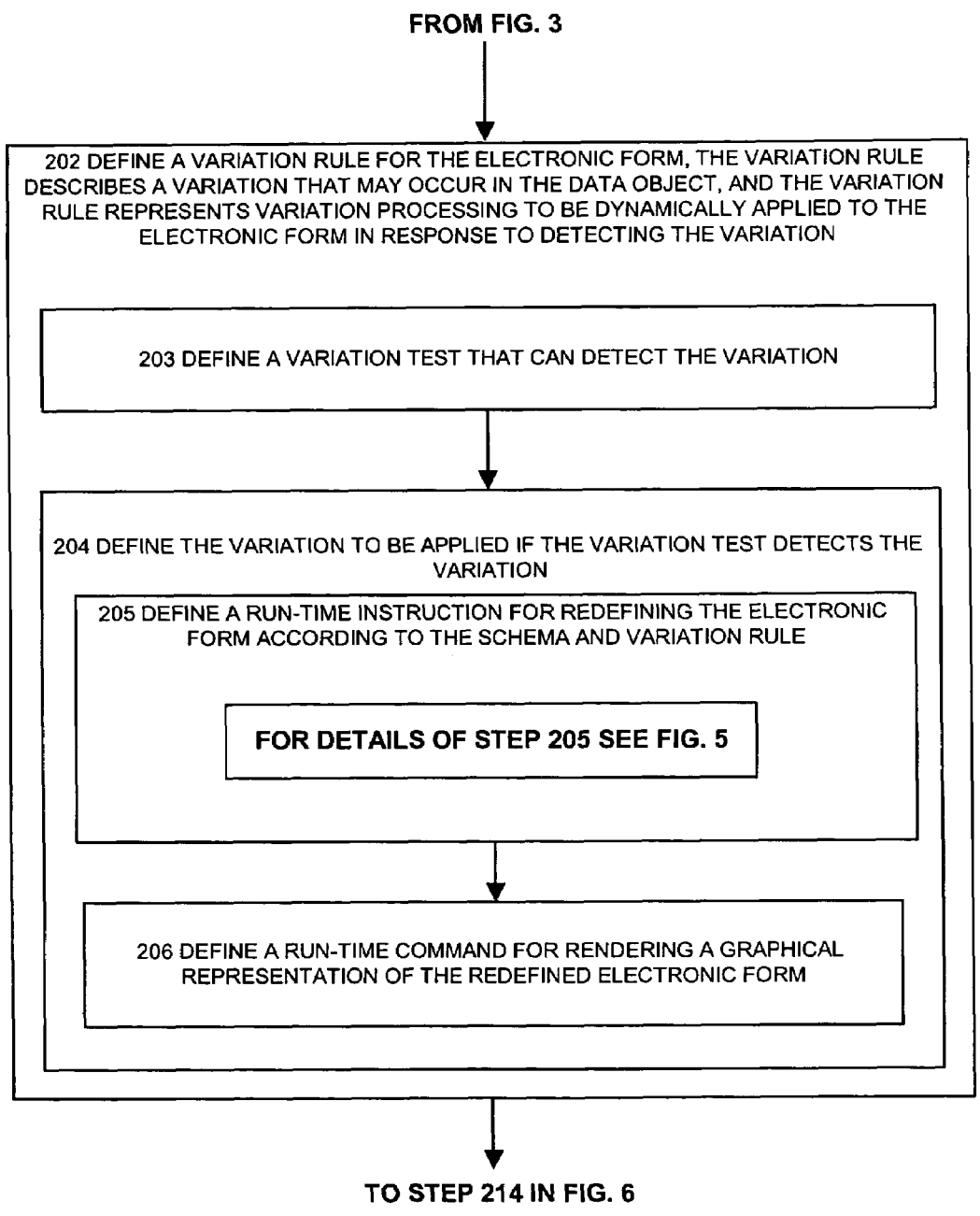
FIG. 4 is a flow chart of processing steps that show high-level processing operations performed by a form manager to define a variation rule for an electronic form.

Continuing to FIG. 4, at step 203, the variation rule 210-1 defines a variation test or condition that can detect the variation. Referring now to FIG. 14B, the variation test can be defined to detect attributes such as <address2> 315 and <homePhone> 370 which are extensions of the <address> 310 and <businessPhone> 360 attributes of address schema 300. Thus, the extension attributes 315, 370 represent the variation in data object 220-1 to be detected by the variation test. The variation rule 210-1 further represents alternate processing to be dynamically applied to form 200-1 in response to detecting the variation.

In step 204, the form manager 150 defines variation processing to be applied if the variation test detects the variation. Referring still to FIG. 14B, such variation processing can be run-time instructions that define how electronic form 200-1 can be populated by data object 220-1 during run-time 260-1 in order to include the detected <address2> 315 and <homePhone> 370 attributes.

In step 205, the form manager 150 defines a run-time instruction for redefining the electronic form according to the schema 300 and the variation rule. Specifically, the run-time instruction for redefining electronic form 200-1 can be one or more instructions that modify the definition of electronic form 200-1 to be populated with the detected variation, such as detected <address2> 315 and <homePhone> 370 attributes.

At step 206, the form manager 150 further defines a run-time command for rendering a graphical representation 160 of the redefined electronic form. For instance, the electronic form 200-1 can be rendered according to a new definition that takes into account the variations of data object 220-1. Thus, an accurate and updated representation 160 of data object 220-1 can be displayed to user 108.

Figure 5:
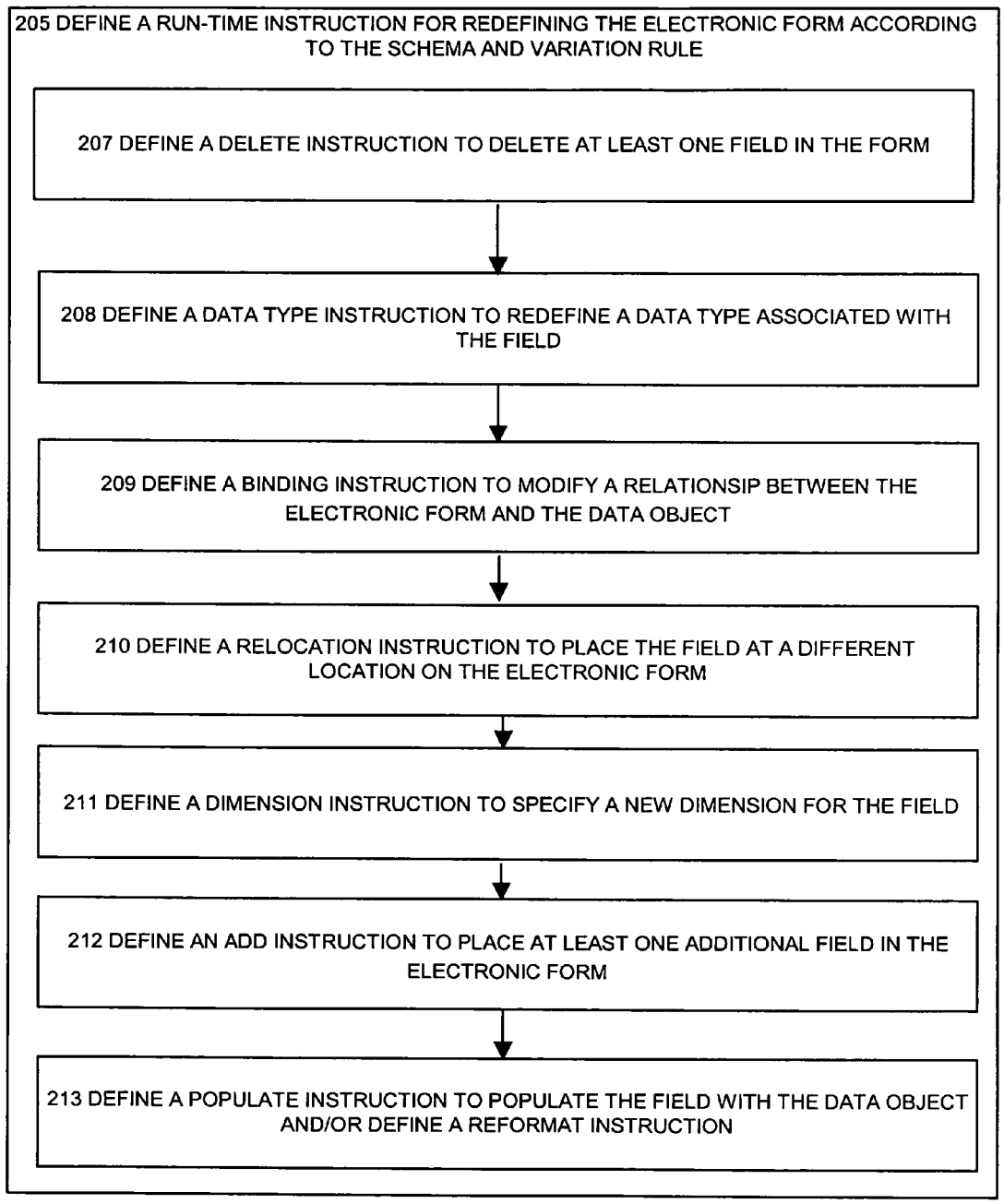
FIG. 5 is a flow chart of processing steps that show high-level processing operations performed by a form manager to define a run-time instruction for redefining an electronic form.

FIG. 5 shows details of step 205 with steps 207-213 where the form manager 150 further defines the run-time instructions for redefining form 200-1. At 207, a delete instruction is defined to delete at least one field 205-1 in the form 200-1. At 208, a data type instruction is defined to redefine a data type associated with the field 205-1. At 209, a binding instruction is defined to modify a relationship between the electronic form 200-1 and the data object 220-1, such that the form 200-1 and the data object 220-1 can properly communicate with each other. At step 210, a relocation instruction is defined to place the field 205-1 at a different location on the electronic form 200-1. At 211, a dimension instruction is defined for specifying a new dimension for the field 205-1. At 212, an add instruction is defined for placing at least one additional field 205-1 in the electronic form 200-1. At 213, a populate instruction is defined for populating the field 205-1 with the data object 220-1, such as inserting a data value of data object 220-1 into field 205-1. A reformat instruction can also be defined which can modify the appearance of the data object in the field. For example, the reformat instruction accounts for modifications regarding font, style, font size, text effects (e.g. bold, italics), layout, and accessibility option (e.g. specifying screen reader text).

Figure 6:
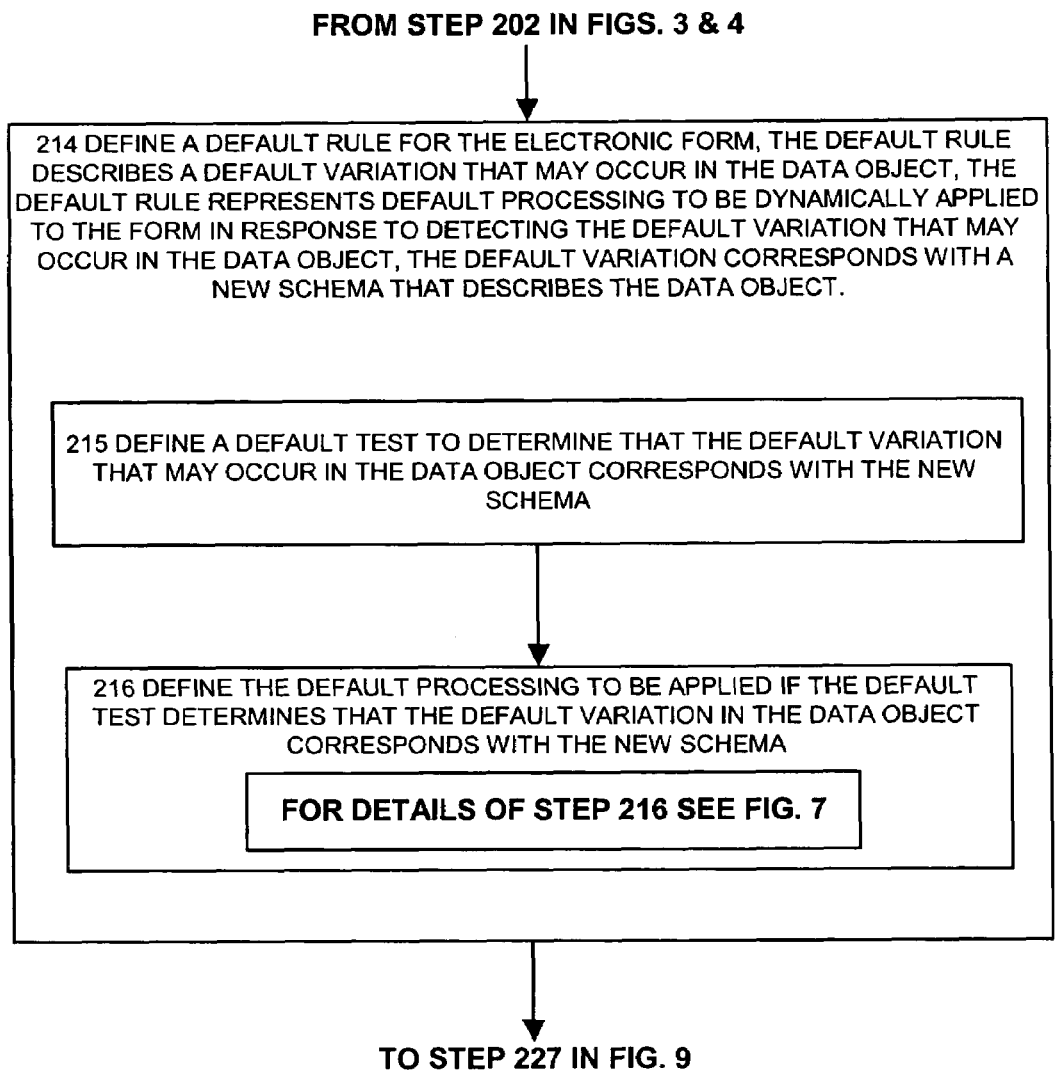
FIG. 6 is a flow chart of processing steps that show high-level processing operations performed by a form manager to define a default rule for an electronic form.

Continuing the discussion with FIG. 6, at step 214, the form manager 150 defines a default rule 211-1 for the electronic form 200-1, the default rule 211-1 describing a default variation that may occur in the data object 220-1. The default rule 211-1 further represents default processing to be dynamically applied to the form 200-1 in response to detecting a default variation that may occur in the data object 220-1, the default variation corresponding with a new schema that describes the data object 220-1. Such a new schema, for example, can describe a data object organized according to a different data structure or a data object with different attributes.

At step 215, the default rule 211-1 defines a default test to determine that the default variation that may occur in the data object 220-1 corresponds with a new schema. Referring to FIG. 15, the default test can be defined to determine that data object 220-1 contains previously unknown attributes, such as <province> 440 and <postalCode> 450, thereby indicating data object 220-1 corresponds with a new schema 400. The unknown attributes 440, 450 represent the default variation since they do not correspond with the previously defined address schema 300.

Figure 7:
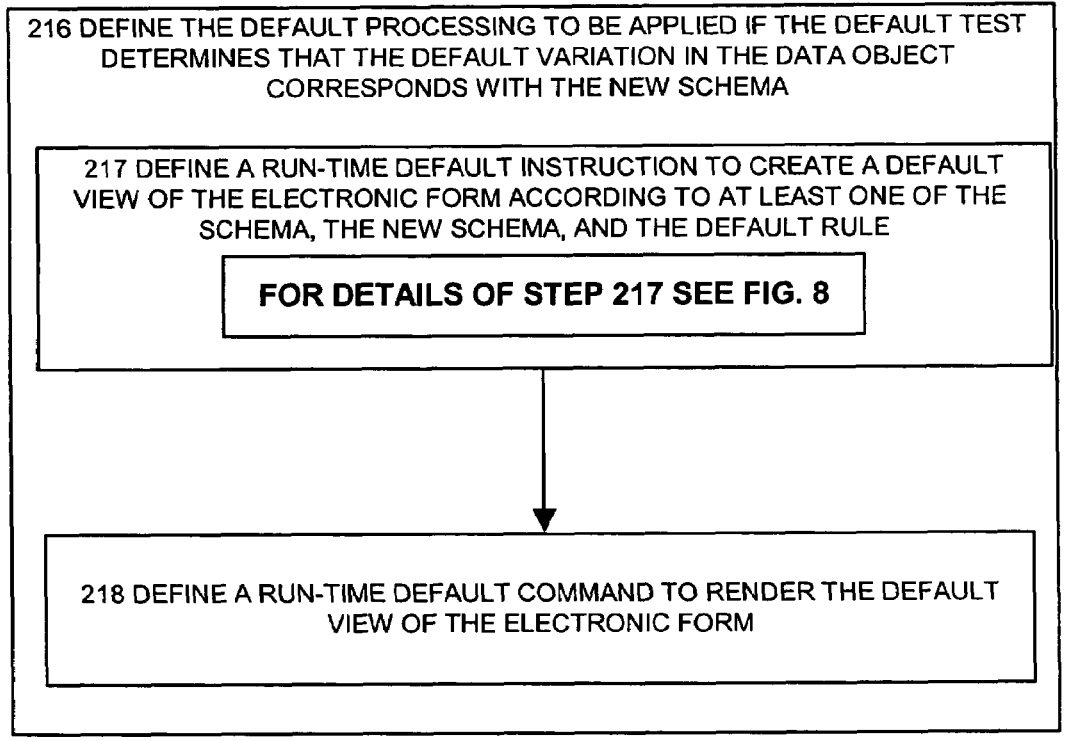
FIG. 7 is a flow chart of processing steps that show high-level processing operations performed by a form manager to define default processing for an electronic form.

At step 216 of FIG. 7, the form manager 150 defines the default processing to be applied if the default test determines that the default variation in the data object 220-1 corresponds with the new schema 400. Referring still to FIG. 15, such default processing can define how to populate electronic form 200-1 with the detected <province> 440 and <postalCode> 450 attributes of data object 220-1 described by new schema 400.

In step 217, the form manager 150 defines a run-time default instruction to create a default view of the electronic form 200-1 according to at least one of the schema 300, the new schema 400 and the default rule 211-1 and further defines a run-time default command for rendering the default view of the electronic form at step 218. Continuing with the example of FIG. 15, the run-time default instruction for redefining electronic form 200-1 can be one or more run-time instructions that modify the form's 200-1 definition to account for new schema 400 such that data object 220-1 having the detected <province> 440 and <postalCode> 450 attributes can populate the form 200-1.

Figure 8:
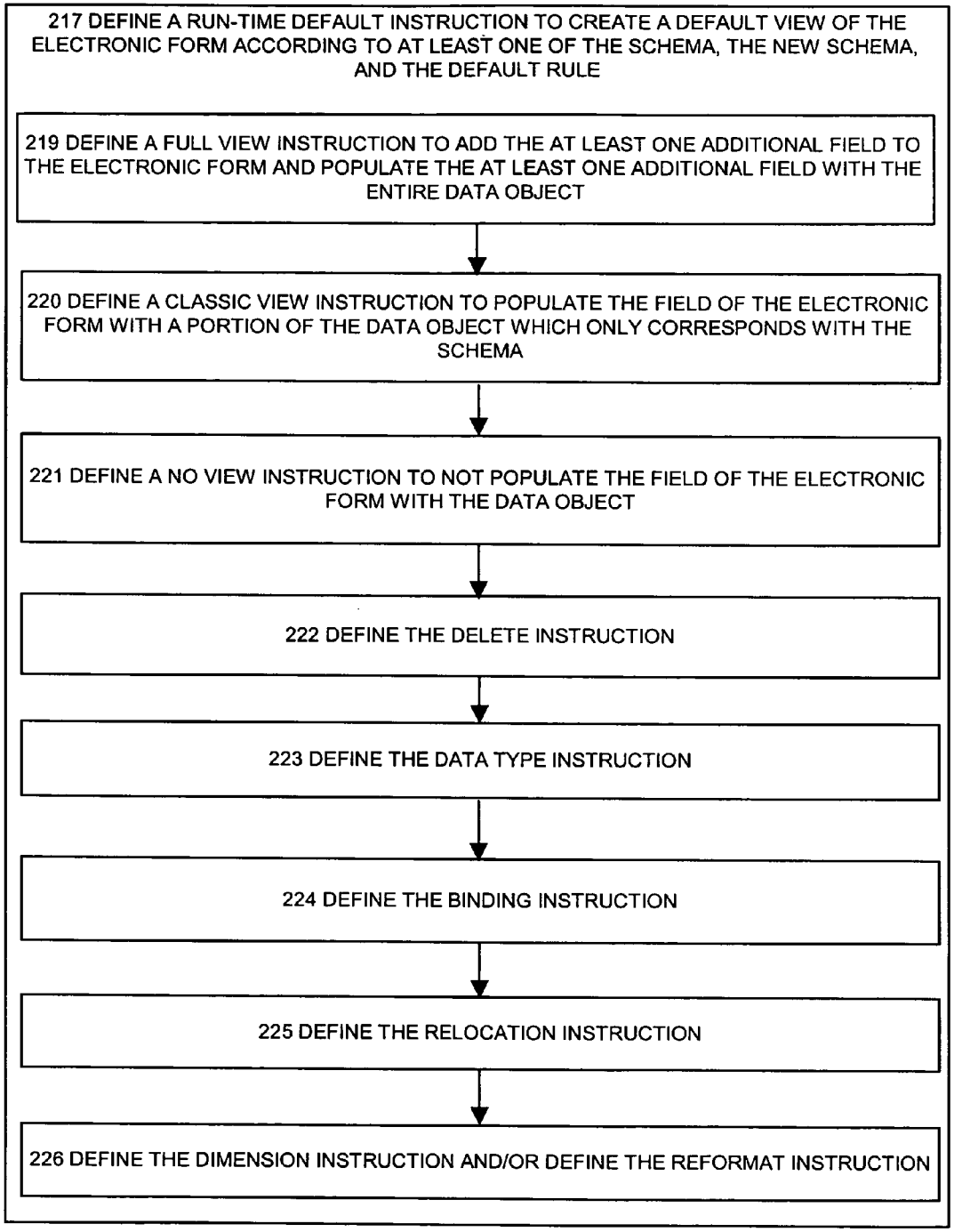
FIG. 8 is a flow chart of processing steps that show high-level processing operations performed by a form manager to define a run-time default instruction for an electronic form.

In steps 219-221 as shown in FIG. 8, the form manager 150 defines one or more default instructions that can redefine the form 200-1. At 219, a full view instruction can be defined to add at least one additional field 205-1 to the electronic form 200-1 and to populate one or more additional fields 205-1 with the entire data object 220-1 that is described by the new schema 400. At 220, a classic view instruction can be defined to populate the field 205-1 of the electronic form 200-1 with a portion of the data object 220-1 which only corresponds with the schema 300 and not the new schema 400. At 221, a no view instruction can be defined to not populate the field 205-1 of the electronic form with the data object 220-1 described by the new schema 400.

In steps 222 to 226 of FIG. 8, the form manager 150 further defines the delete instruction, the data type instruction, the binding instruction, the relocation instruction and the dimension instruction, respectively. The reformat instruction can be defined as a default instruction as well.

II. Employing Form Manager 150 During Run Time 260-1

Figure 9:
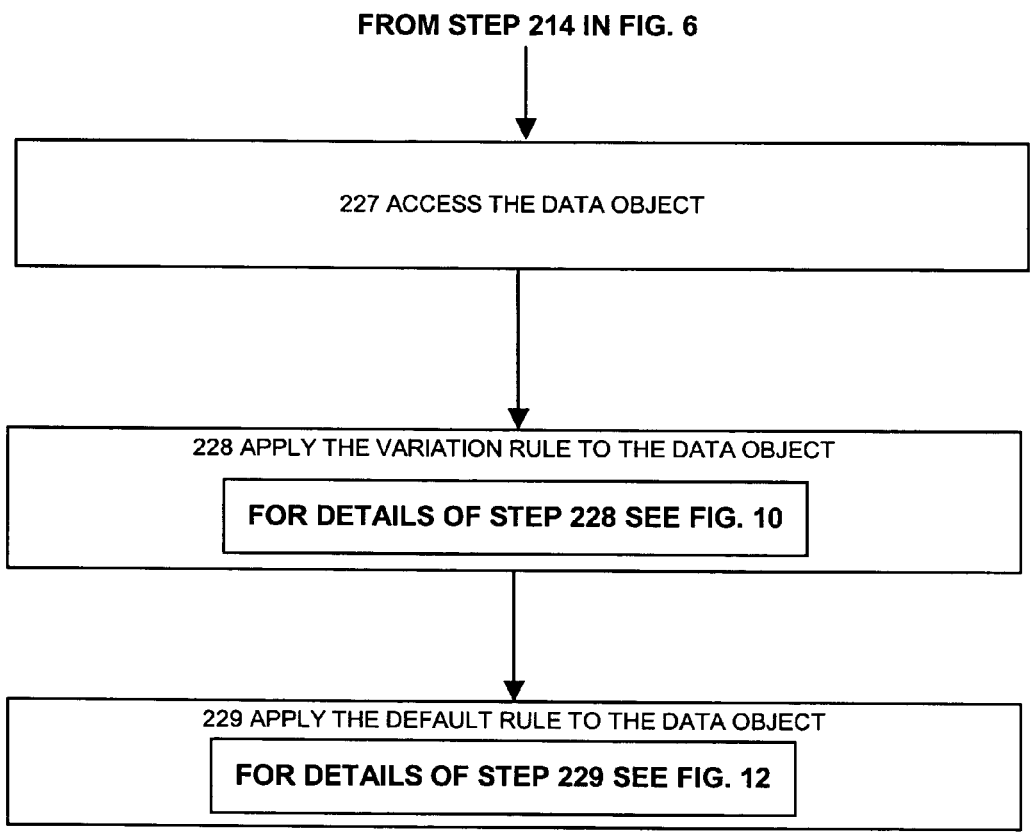
FIG. 9 is a flow chart of processing steps that show high-level processing operations performed by a form manager to show application of a variation rule and a default rule.

At step 227 of FIG. 9, the form manager 150 accesses a data object 220-1. Note that the data object 220-1 in this example is a data object that may not exactly conform to the schema 300. In other words, the data object 220-1 is a second data object 220-1 in which, perhaps, a data format of data within the data object 220-1 does not correspond exactly to the schema 300. As a specific example, schema 300 may define a particular address format, but data object 220-1 may have data that conforms to a slight variation of this address format, as shown in FIGS. 14A and 14B. In step 228, form manager 150 applies variation rule 210-1 to data object 220-1. The variation rule 210-1 allows the data object 220-1 (i.e. the second data object 220-1) to populate the field 205 in the form 200-1 to produce a rendered form 160. For example, form manager 150 can apply variation rule 210-1 to detect the existence of extension attributes 315, 370 in data object 220-1. Additionally, in step 229, the form manager 150 applies the default rule 211-1 to the data object 220-1 in order to determine if the data object 220-1 corresponds with a new schema 400 and not the schema 300 that is associated to the electronic form 200-1.

Figure 10:
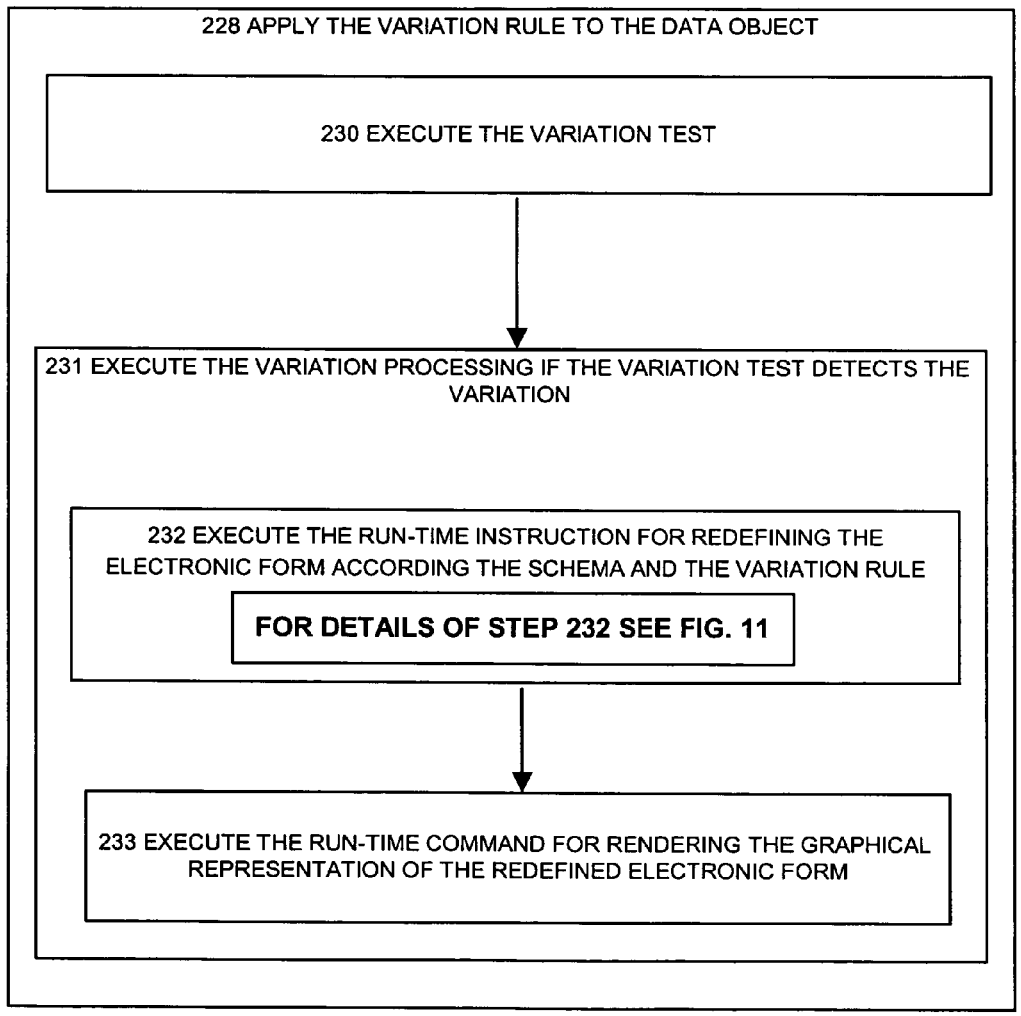
FIG. 10 is a flow chart of processing steps that show high-level processing operations performed by a form manager to apply a variation rule.

At step 230 of FIG. 10, the form manager 150 executes the variation test. The form manager 150 can detect that data object 220-1, as shown in the example of FIG. 14B, does in fact have two extension attributes, <address2> 315 and <homephone> 370, thus satisfying the variation test. At step 231, the form manager 150 executes the variation processing if the variation test detects the variation.

In step 232, the form manager 150 executes the run-time instruction for redefining the electronic form 200-1 according to the schema 300 and the variation rule. Thus, continuing in terms of FIG. 14B, form manager 150 can execute one or more run-time instructions to allow for extension attributes, <address2> 315 and <homephone> 370, to populate form 200-1. In step 233, the form manager 150 executes the run-time command for rendering the graphical representation 160 of the redefined electronic form.

Figure 11:
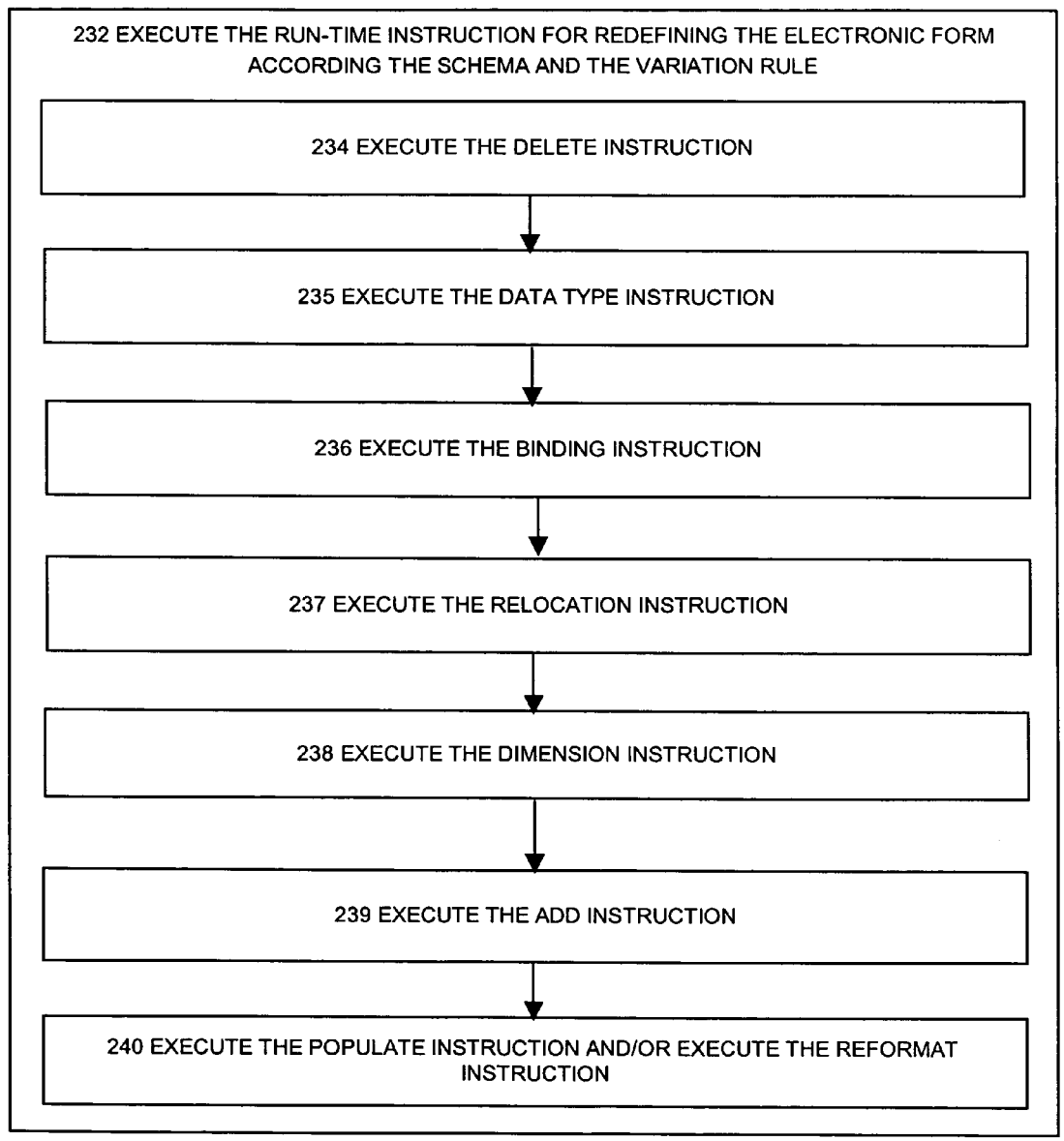
FIG. 11 is a flow chart of processing steps that show high-level processing operations performed by a form manager to execute a run-time instruction for redefining an electronic form.

In steps 234 to 240 as shown in FIG. 11, the form manager 150 executes the delete instruction, the data type instruction, the binding instruction, the relocation instruction, the dimension instruction, the add instruction and the populate instruction, and the reformat instruction, respectively. Specifically, for the example of FIG. 14B, form manager 150 can execute an add instruction, a binding instruction and a populate instruction for each of the <address2> 315 and <homephone> 370 attributes. Therefore, electronic form 200-1 can be redefined to include the extension attributes adding two new fields 205-1 to form 200-1, binding the new fields 205-1 to the extension attributes 315, 370, and populating the new fields with the data values of the extension attributes 315, 370 in data object 220-1.

Figure 12:
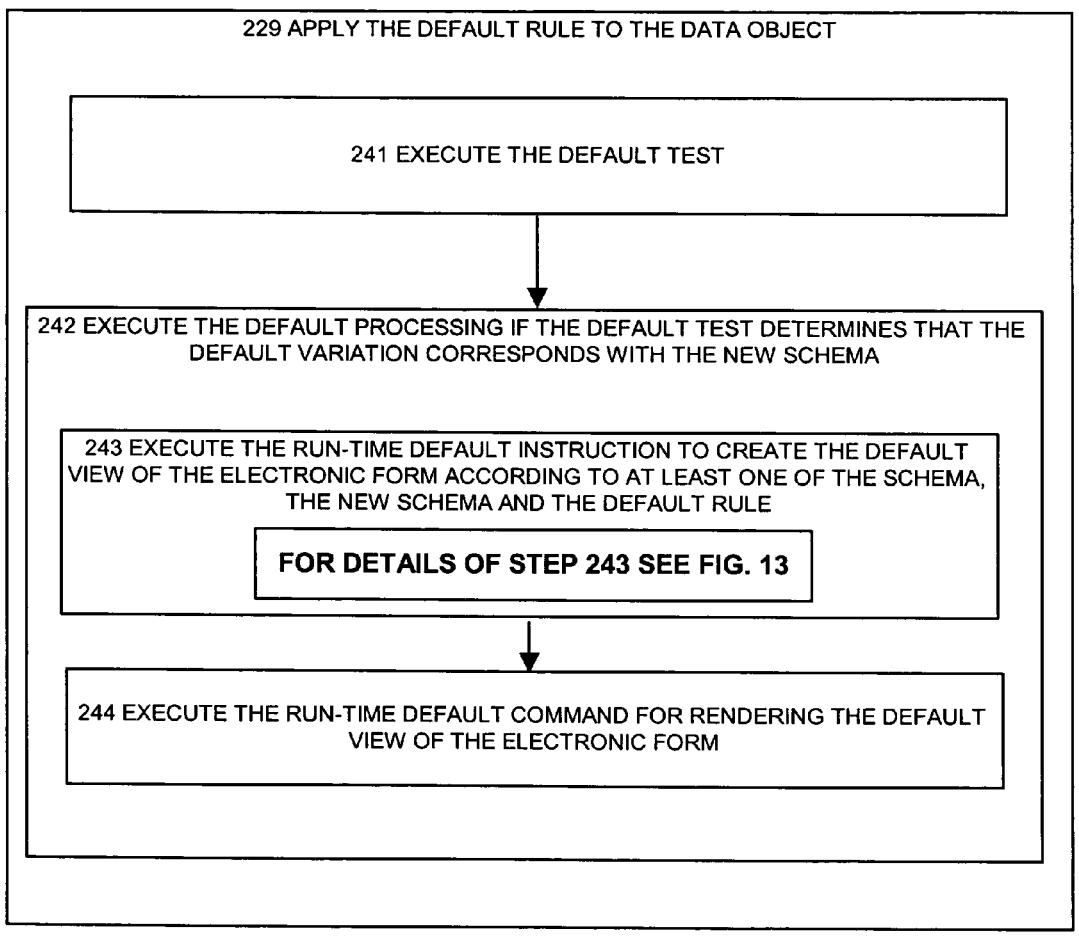
FIG. 12 is a flow chart of processing steps that show high-level processing operations performed by a form manager to apply a default rule.

At step 241 of FIG. 12, the form manager 150 executes the default test. Form manager 150 can detect that data object 220-1, as shown in FIG. 15, corresponds with a new schema 400 by having two unknown attributes, <province> 440 and <postalCode> 450 attributes. Thus, the default test is satisfied since data object 220-1 no longer conforms to schema 300. In step 242, the form manager 150 executes the default processing if the default test determines that the default variation corresponds with the new schema 400.

In step 243, the form manager 150 executes the run-time default instruction to create the default view of the electronic form according to at least one of the schema 300, the new schema 400 and the default rule 211-1. Thus, form manager 150 can execute one or more run-time default instructions to allow for the two unknown attributes, <province> 440 and <postalCode> 450, to be populated in the form 200-1. In step 244, the form manager 150 executes the run-time default command for rendering the default view of the electronic form 200-1.

Figure 13:
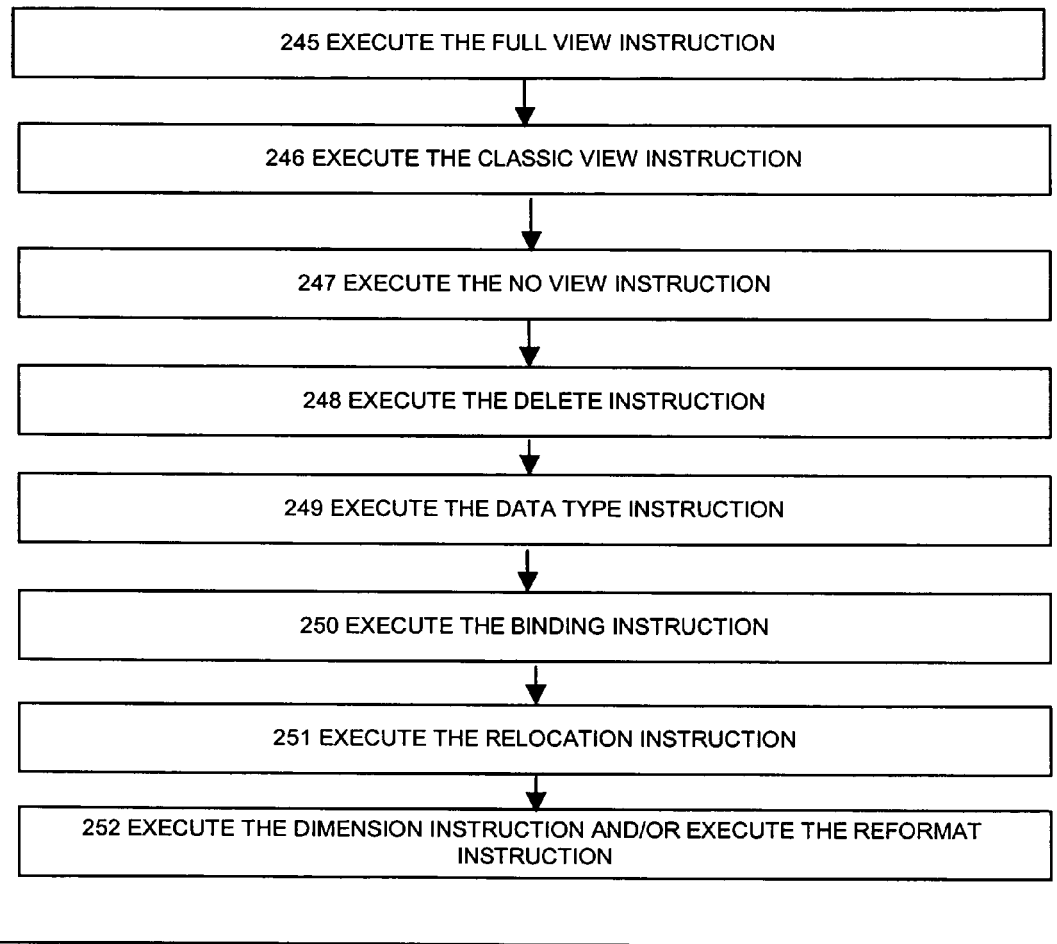
FIG. 13 is a flow chart of processing steps that show high-level processing operations performed by a form manager to execute a run-time default instruction for creating a default view of an electronic form.

In steps 245 to 252 as shown in FIG. 13, the form manager 150 executes the full view instruction, the classic view instruction, the no view instruction, the delete instruction, the data type instruction, the binding instruction, the relocation instruction, and the dimension instruction, and the reformatting instruction respectively. By executing the full view instruction, all attributes of data object 220-1, including the two unknown attributes, <province> 440 and <postalCode> 450, can populate the form 200-1 prior to rendering the default view of the form 200-1. Once the form 200-1 is rendered, the default view can display include the entire data object 220-1. The electronic form 200-1 can be redefined to include the two unknown attributes prior to rendering by adding two new fields 205-1 to the form 200-1, binding the new fields 205-1 to the unknown attributes 440, 450, and populating the new fields with the data values of the unknown attributes 440, 450 in data object 220-1.

By executing the classic view instruction, only attributes of data object 220-1 that correspond with the originally associated schema 300 can populate the form 200-1. Referring back to FIG. 14A, address schema 300 was originally defined and associated with form 200-1. Once rendered, the form 200-1 can include the data object 220-1 but will not accommodate the unknown attributes, <province> 440 and <postalCode> 450, since the classic view instruction is based on address schema 300 and not new schema 400. By executing the no view instruction, the electronic form will not be populated by data object 220-1 at all, thereby indirectly signaling to the user 108 that changes to the data object 220-1 have occurred.

Note again that techniques herein are well suited for dynamic definition of an electronic form via a form manager. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer implemented method in which at least one computer system accesses instructions from computer storage and executes the instructions to perform steps of:

defining an electronic form comprising a field to populate with a data object;

defining a schema associated to the form, the schema describing the data object;

defining a variation rule for the electronic form, the variation rule describing a variation that may occur in the data object, and the variation rule representing variation processing to be dynamically applied to the electronic form in response to detecting the variation;

defining a run-time instruction for redefining the electronic form according to the schema and the variation rule;

defining a run-time command for rendering a graphical representation of the redefined electronic form;

receiving the data object with a plurality of data attributes defined according to a second schema;

executing the variation rule to determine whether the second schema differs from the schema associated with the electronic form, wherein executing the variation rule includes: (i) executing a variation test that can detect the variation; and (ii) executing the variation processing to be applied if the variation test detects the variation;

upon determining the second schema differs from the schema associated with the electronic form, executing the run-time instruction to redefine the electronic form to include multiple new fields for display of the plurality of data attributes defined according to the second schema;

binding each new field in the electronic form to a respective data attribute defined according to the second schema; and displaying each respective data attribute in a corresponding bound new field.

2. The computer implemented method of claim 1, wherein defining the variation rule for the electronic form comprises:

defining a variation test that can detect the variation; and
defining the variation processing to be applied if the variation test detects the variation.

3. The computer implemented method of claim 1, wherein defining the run-time instruction for redefining the electronic form according to the schema and the variation rule comprises:

defining a delete instruction to delete at least one field in the form;

defining a data type instruction to redefine a data type associated with the field;

defining a binding instruction to modify a relationship between the electronic form and the data object;

defining a relocation instruction to place the field at a different location on the electronic form;

defining a dimension instruction for specifying a new dimension for the field;

defining an add instruction for placing at least one additional field in the electronic form;

defining a reformat instruction for modifying the appearance of the data; and defining a populate instruction for populating the field with the data object.

4. The computer implemented method of claim 1, further comprising:
   defining a default rule for the electronic form, the default rule describing a default variation that may occur in the data object, the default rule representing default processing to be dynamically applied to the form in response to detecting a default variation that may occur in the data object, the default variation corresponding with a new schema that describes the data object.

5. The computer implemented method of claim 4, wherein defining the default rule for the electronic form comprises:
   defining a default test to determine that the default variation that may occur in the data object corresponds with the new schema; and
   defining the default processing to be applied if the default test determines that the default variation in the data object corresponds with the new schema.

6. The computer implemented method of claim 5, wherein defining the default processing comprises:
   defining a run-time default instruction to create a default view of the electronic form according to at least one of the schema, the new schema and the default rule; and
   defining a run-time default command for rendering the default view of the electronic form.

7. The computer implemented method of claim 6, wherein defining the run-time default instruction for creating a default view of the electronic form according to at least one of the schema, the new schema and the default rule comprises:
   defining a full view instruction to add the at least one additional field to the electronic form and to populate the at least one additional field with the entire data object;
   defining a classic view instruction to populate the field of the electronic form with a portion of the data object which only corresponds with the schema;
   defining a no view instruction to not populate the field of the electronic form with the data object;
   defining the delete instruction;
   defining the data type instruction;
   defining the binding instruction;
   defining the relocation instruction;
   defining the reformat instruction; and
   defining the dimension instruction.

8. The computer implemented method of claim 4, further comprising:
   accessing a second data object that does not conform to the schema;
   applying the variation rule to the second data object to allow the second data object to be populate the field; and
   applying the default rule to the second data object.

9. The computer implemented method of claim 8, wherein applying the variation rule to the second data object comprises:
   executing the variation test; and
   executing the variation processing if the variation test detects the variation.

10. The computer implemented method of claim 9, wherein executing the variation processing comprises:
   executing the run-time instruction for redefining the electronic form according to the schema and the variation rule; and
   executing the run-time command for rendering the graphical representation of the redefined electronic form.

11. The computer implemented method of claim 10, wherein executing the run-time instruction for redefining the electronic form according to the schema and the variation rule comprises:
   executing the delete instruction;
   executing the data type instruction;
   executing the binding instruction;
   executing the relocation instruction;
   executing the dimension instruction;
   executing the add instruction;
   executing the reformat instruction; and
   executing the populate instruction.

12. The computer implemented method of claim 8, wherein the applying the default rule to the second data object comprises:
   executing the default test; and
   executing the default processing if the default test determines that the second data object corresponds with the new schema.

13. The computer implemented method of claim 12, wherein executing the default processing comprises:
   executing the run-time default instruction to create the default view of the electronic form according to at least one of the schema, the new schema and the default rule; and
   executing the run-time default command for rendering the default view of the electronic form.

14. The computer implemented method of claim 13, wherein executing the run-time default instruction for creating the default view of the electronic form comprises:
   executing the full view instruction;
   executing the classic view instruction;
   executing the no view instruction;
   executing the delete instruction;
   executing the data type instruction;
   executing the binding instruction;
   executing the relocation instruction;
   executing the reformat instruction; and
   executing the dimension instruction.

15. A computer readable storage medium comprising executable instructions encoded thereon operable on a computerized device to perform processing comprising:
   defining an electronic form comprising a field to populate with a data object;
   defining a schema associated to the form, the schema describing the data object;
   defining a variation rule for the electronic form, the variation rule describing a variation that may occur in the data object, and the variation rule representing variation processing to be dynamically applied to the electronic form in response to detecting the variation;
   defining a run-time instruction for redefining the electronic form according to the schema and the variation rule;
   defining a run-time command for rendering a graphical representation of the redefined electronic form;
   defining a default rule for the electronic form, the default rule describing a default variation that may occur in the data object, the default rule representing default processing to be dynamically applied to the form in response to detecting a default variation that may occur in the data object, the default variation corresponding with a new schema that describes the data object;
   receiving the data object with a plurality of data attributes defined according to a second schema;
   executing the variation rule to determine whether the second schema differs from the schema associated with the electronic form, wherein executing the variation rule includes: (i) executing a variation test that can detect the variation; and (ii) executing the variation processing to be applied if the variation test detects the variation;

upon determining the second schema differs from the schema associated with the electronic form, executing the run-time instruction to redefine the electronic form to include multiple new fields for display of the plurality of data attributes defined according to the second schema;

binding each new field in the electronic form to a respective data attribute defined according to the second schema; and displaying each respective data attribute in a corresponding bound new field.

16. The computer readable storage medium of claim 15, further comprising:

accessing a second data object that does not conform to the schema;

applying the variation rule to the data object to allow the second data object to populate the field; and applying the default rule to the second data object.

17. The computer readable storage medium claim 16, wherein applying the default rule for the electronic form comprises:

executing a default test to determine that the default variation that may occur in the data object corresponds with the new schema; and executing the default processing to be applied if the default test determines that the default variation in the second data object corresponds with the new schema.

18. A computerized device comprising:

a memory;

a display;

a processor;

an interconnection mechanism coupling the memory, the display and the processor;

wherein the memory is encoded with a form manager application that when executed on the processor provides a form manager process that implements processing on the computerized device;

the form manager defining an electronic form comprising a field to populate with a data object, the form manager rendering the electronic form on the display;

the form manager defining a schema associated to the form, the schema describing the data object;

the form manager defining a variation rule for the electronic form, the variation rule describing a variation that may occur in the data object, and the variation rule representing variation processing to be dynamically applied to the electronic form in response to detecting the variation;

the form manager defining a run-time instruction for redefining the electronic form according to the schema and the variation rule;

the form manager defining a run-time command for rendering a graphical representation of the redefined electronic form;

the form manager receiving the data object with a plurality of data attributes defined according to a second schema;

the form manager executing the variation rule to determine whether the second schema differs from the schema associated with the electronic form, wherein executing the variation rule includes: (i) executing a variation test that can detect the variation; and (ii) executing the variation processing to be applied if the variation test detects the variation;

upon determining the second schema differs from the schema associated with the electronic form, the form manager executing the run-time instruction to redefine the electronic form to include multiple new fields for display of the plurality of data attributes defined according to the second schema;

the form manager binding each new field in the electronic form to a respective data attribute defined according to the second schema; and the form manager displaying each respective data attribute in a corresponding bound new field.

19. The computer-implemented method as in claim 1, comprising:

receiving first input comprising the data object with a plurality of data attributes; and executing the variation rule to detect whether the schema fails to recognize a particular data attribute of the data object; and upon detecting the schema fails to recognize the particular data attribute of the data object, executing the run-time instruction to redefine the electronic form to include a new field for display of the particular data attribute detected by execution of the variation rule.

20. The computer-implemented method as in claim 19, wherein executing the run-time instruction includes:

executing the run-time instruction prior to receiving second input from a source of the first input.

21. The computer-implemented method as in claim 1, comprising:

receiving a plurality of data attributes in the data object, a first data attribute compliant with the schema associated with the electronic form;

executing the variation rule to detect whether the schema fails to accommodate a second data attribute related to an attribute category of the first data attribute; and upon detecting the schema fails to accommodate the second data attribute, executing the run-time instruction to redefine the electronic form to include a new field for display of the second data attribute in a portion of the electronic form related to the attribute category.

22. The computer-implemented method as in claim 21, wherein executing the run-time instruction includes:

identifying a first form location for a first field to be populated by the first data attribute related to the attribute category;

identifying a second form location for a second field to be populated by a data attribute related to a second attribute category; and modifying the second form location to accommodate placement of a form location for the new field proximate to the first form location.

23. The computer-implemented method as in claim 22, wherein modifying the second form location includes:

positioning the form location for the new field between the first form location and the modified second form location.

24. The computer-implemented method as in claim 21, wherein executing the variation rule includes:

determining the second data attribute comprises an extension of the first data attribute.

25. The computer-implemented method as in claim 21, wherein executing the variation rule includes:

executing the variation rule based only on receipt of the data object.

* * * * *

UNITED STATES PATENT AND TRADEMARK OFFICE
CERTIFICATE OF CORRECTION

PATENT NO.       : 7,664,776 B1                                      Page 1 of 1
APPLICATION NO.  : 11/641150
DATED            : February 16, 2010
INVENTOR(S)      : Stefan Cameron It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 340 days.

Signed and Sealed this

Thirtieth Day of November, 2010

David J. Kappos
*Director of the United States Patent and Trademark Office*